United States Patent
Rokhsaz et al.

(10) Patent No.: US 11,446,969 B2
(45) Date of Patent: *Sep. 20, 2022

(54) PRESSURE BASED WIRELESS SENSOR AND APPLICATIONS THEREOF

(71) Applicant: RFMicron, Inc., Austin, TX (US)

(72) Inventors: Shahriar Rokhsaz, Austin, TX (US); Brian David Young, Austin, TX (US)

(73) Assignee: RFMicron, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/102,245

(22) Filed: Nov. 23, 2020

(65) Prior Publication Data

US 2021/0070115 A1 Mar. 11, 2021

Related U.S. Application Data

(60) Continuation of application No. 16/017,848, filed on Jun. 25, 2018, now Pat. No. 10,843,510, which is a
(Continued)

(51) Int. Cl.
| | |
|---|---|
| *B60C 23/00* | (2006.01) |
| *G06K 7/10* | (2006.01) |
| *B60C 23/04* | (2006.01) |
| *H04B 5/00* | (2006.01) |
| *H04L 67/00* | (2022.01) |
| *H02J 50/00* | (2016.01) |
| *H04L 67/04* | (2022.01) |
| *H04L 67/12* | (2022.01) |
| *H04W 84/18* | (2009.01) |

(52) U.S. Cl.
CPC .......... *B60C 23/00* (2013.01); *B60C 23/0413* (2013.01); *B60C 23/0474* (2013.01); *G06K 7/10148* (2013.01); *G06K 7/10297* (2013.01); *H02J 50/00* (2016.02); *H04B 5/0062* (2013.01); *H04L 67/00* (2013.01); *H04B 5/0012* (2013.01); *H04B 5/0037* (2013.01); *H04L 67/04* (2013.01); *H04L 67/12* (2013.01); *H04W 84/18* (2013.01)

(58) Field of Classification Search
None
See application file for complete search history.

(56) References Cited

U.S. PATENT DOCUMENTS

| | | |
|---|---|---|
| 8,952,792 B1 | 2/2015 | Srinivas |
| 9,087,282 B1 | 7/2015 | Hyde et al. |

(Continued)

*Primary Examiner* — Thomas S McCormack
(74) *Attorney, Agent, or Firm* — Garlick & Markison; Timothy W. Markison

(57) ABSTRACT

A radio frequency identification (RFID) tag includes an antenna, an analog front end, a processing circuit, and memory. The analog front end includes a power circuit, a tuning circuit, a transmitter, and a receiver. The power circuit is operably coupled to convert a radio frequency (RF) signal into a power supply voltage. The tuning circuit, when enabled, adjusts an RF characteristic of the analog front end to tune power harvesting from the RF signal. The transmitter is operably coupled to transmit a response signal to the RFID reader via the antenna. The receiver is operably coupled to receive a command signal from the RFID reader, wherein the command signal is contained within a portion of the RF signal. The processing circuit is operable to interpret the command signal and generate the response signal.

9 Claims, 8 Drawing Sheets

Related U.S. Application Data continuation of application No. 15/784,484, filed on Oct. 16, 2017, now Pat. No. 10,005,324, which is a continuation of application No. 15/348,365, filed on Nov. 10, 2016, now Pat. No. 9,789,738, which is a continuation-in-part of application No. 15/217,816, filed on Jul. 22, 2016, now Pat. No. 10,715,209, said application No. 15/348,365 is a continuation-in-part of application No. 15/157,723, filed on May 18, 2016, now abandoned, which is a continuation-in-part of application No. 14/869,940, filed on Sep. 29, 2015, now Pat. No. 9,607,188, said application No. 15/348,365 is a continuation-in-part of application No. 14/869,940, filed on Sep. 29, 2015, now Pat. No. 9,607,188, said application No. 15/217,816 is a continuation-in-part of application No. 14/256,877, filed on Apr. 18, 2014, now Pat. No. 9,785,807, and a continuation-in-part of application No. 14/150,392, filed on Jan. 8, 2014, now Pat. No. 9,825,608, said application No. 14/256,877 is a continuation-in-part of application No. 13/467,925, filed on May 9, 2012, now Pat. No. 10,224,902, said application No. 14/150,392 is a division of application No. 13/209,420, filed on Aug. 14, 2011, now Pat. No. 8,749,319, said application No. 14/256,877 is a continuation-in-part of application No. 13/209,420, filed on Aug. 14, 2011, now Pat. No. 8,749,319, and a continuation-in-part of application No. 13/209,425, filed on Aug. 14, 2011, now Pat. No. 9,048,819, said application No. 13/467,925 is a continuation-in-part of application No. 13/209,425, filed on Aug. 14, 2011, now Pat. No. 9,048,819, said application No. 13/209,420 is a continuation-in-part of application No. 12/462,331, filed on Aug. 1, 2009, now Pat. No. 8,281,043, said application No. 13/209,425 is a continuation-in-part of application No. 12/462,331, filed on Aug. 1, 2009, now Pat. No. 8,281,043, which is a division of application No. 11/601,085, filed on Nov. 18, 2006, now Pat. No. 7,586,385.

(60) Provisional application No. 62/163,143, filed on May 18, 2015, provisional application No. 62/057,186, filed on Sep. 29, 2014, provisional application No. 62/057,187, filed on Sep. 29, 2014, provisional application No. 62/196,036, filed on Jul. 23, 2015, provisional application No. 61/428,170, filed on Dec. 29, 2010, provisional application No. 61/485,732, filed on May 13, 2011, provisional application No. 61/814,241, filed on Apr. 20, 2013, provisional application No. 61/833,150, filed on Jun. 10, 2013, provisional application No. 61/833,167, filed on Jun. 10, 2013, provisional application No. 61/833,265, filed on Jun. 10, 2013, provisional application No. 61/871,167, filed on Aug. 28, 2013, provisional application No. 61/875,599, filed on Sep. 9, 2013, provisional application No. 61/896,102, filed on Oct. 27, 2013, provisional application No. 61/929,017, filed on Jan. 18, 2014, provisional application No. 61/934,935, filed on Feb. 3, 2014.

(56) References Cited

U.S. PATENT DOCUMENTS

| | | |
|---|---|---|
| 9,789,738 B2 | 10/2017 | Rokhsaz |
| 2003/0174099 A1 | 9/2003 | Bauer |
| 2003/0234631 A1 | 12/2003 | Schulman |
| 2006/0256691 A1 | 11/2006 | Miura |
| 2006/0290484 A1 | 12/2006 | Bauchot |
| 2007/0156312 A1 | 7/2007 | Breed |
| 2010/0019907 A1 | 1/2010 | Shanks |
| 2010/0207754 A1 | 8/2010 | Shostak |
| 2012/0176240 A1 | 7/2012 | Athalye et al. |
| 2013/0293354 A1 | 11/2013 | Vemagiri et al. | sensor 18-24

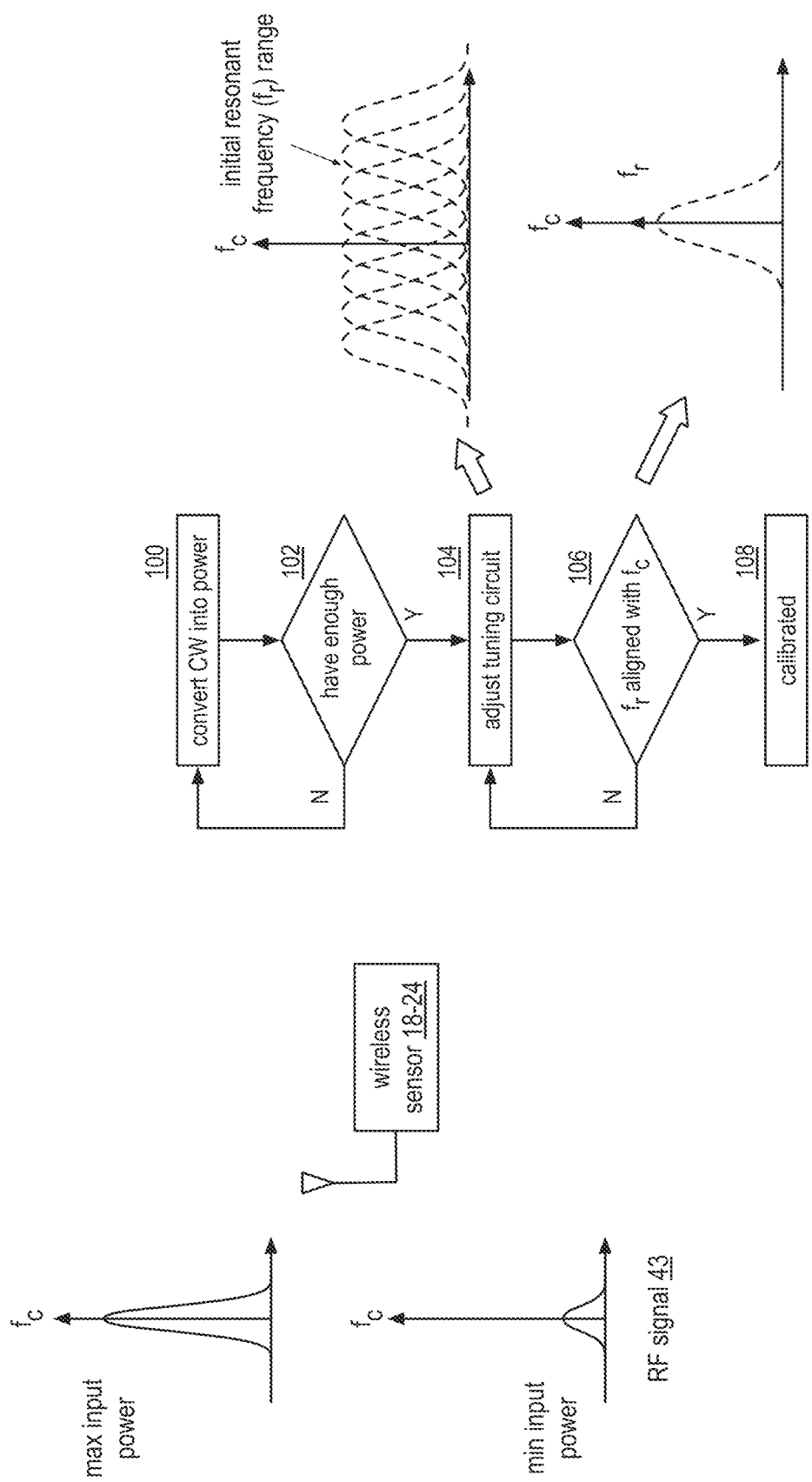

PRESSURE BASED WIRELESS SENSOR AND APPLICATIONS THEREOF

CROSS REFERENCE TO RELATED PATENTS

The present U.S. Utility Patent Application claims priority pursuant to 35 U.S.C. § 120 as a continuation of U.S. Utility application Ser. No. 16/017,848, entitled "PRESSURE BASED WIRELESS SENSOR AND APPLICATIONS THEREOF", filed Jun. 25, 2018, issuing as U.S. Pat. No. 10,843,510 on Nov. 24, 2020, which is a continuation of U.S. Utility application Ser. No. 15/784,484, entitled "PRESSURE BASED WIRELESS SENSOR AND APPLICATIONS THEREOF," filed Oct. 16, 2017, issued as U.S. Pat. No. 10,005,324 on Jun. 26, 2018, which is a continuation of U.S. Utility application Ser. No. 15/348,365, entitled "PRESSURE BASED WIRELESS SENSOR AND APPLICATIONS THEREOF", filed Nov. 10, 2016, issued as U.S. Pat. No. 9,789,738 on Oct. 17, 2017, which is a continuation-in-part of U.S. Utility application Ser. No. 15/157,723, entitled, "PRESSURE BASED WIRELESS SENSOR AND APPLICATIONS THEREOF", filed on May 18, 2016, now abandoned, which claims priority pursuant to 35 U.S.C. § 119(e) to U.S. Provisional Application No. 62/163,143, entitled "RFID TAGS AND SENSORS", filed May 18, 2015, all of which are hereby incorporated herein by reference in their entirety and made part of the present U.S. Utility Patent Application for all purposes.

U.S. Utility patent application Ser. No. 15/348,365 also claims priority pursuant to 35 U.S.C. § 120 as a continuation-in-part of U.S. Utility application Ser. No. 14/869,940, entitled "RADIO FREQUENCY IDENTIFICATION (RFID) TAG(S) and SENSOR(S)", filed Sep. 29, 2015, now U.S. Pat. No. 9,607,188, issued Mar. 28, 2017, which claims priority pursuant to 35 U.S.C. § 119(e) to U.S. Provisional Application No. 62/057,186, entitled "RADIO FREQUENCY IDENTIFICATION (RFID) TAGS AND SENSORS", filed Sep. 29, 2014 and U.S. Provisional Application No. 62/057,187, entitled "METHOD AND APPARATUS FOR IMPEDANCE MATCHING USING DITHERING", filed Sep. 29, 2014, all of which are hereby incorporated herein by reference in their entirety and made part of the present U.S. Utility Patent Application for all purposes.

U.S. Utility patent application Ser. No. 15/157,723 also claims priority pursuant to 35 U.S.C. § 120 as a continuation-in-part of U.S. Utility application Ser. No. 14/869,940, entitled "RADIO FREQUENCY IDENTIFICATION (RFID) TAG(S) and SENSOR(S)", filed Sep. 29, 2015, issued as U.S. Pat. No. 9,607,188 on Mar. 28, 2017, which claims priority pursuant to 35 U.S.C. § 119(e) to U.S. Provisional Application No. 62/057,186, entitled "RADIO FREQUENCY IDENTIFICATION (RFID) TAGS AND SENSORS", filed Sep. 29, 2014 and U.S. Provisional Application No. 62/057,187, entitled "METHOD AND APPARATUS FOR IMPEDANCE MATCHING USING DITHERING", filed Sep. 29, 2014, all of which are hereby incorporated herein by reference in their entirety and made part of the present U.S. Utility Patent Application for all purposes.

U.S. Utility patent application Ser. No. 16/017,848 further claims priority pursuant to 35 U.S.C. § 120 as a continuation-in-part of U.S. Utility application Ser. No. 15/217,816, entitled "COMPUTING DEVICE FOR PROCESSING ENVIRONMENTAL SENSED CONDITIONS," filed Jul. 22, 2016, which claims priority pursuant to 35 U.S.C. § 119(e) to U.S. Provisional Application No. 62/196,036, entitled "PASSIVE RFID SOFTWARE DEFINED RADIO SYSTEM", filed Jul. 23, 2015, which is hereby incorporated herein by reference in its entirety and made part of the present U.S. Utility Patent Application for all purposes.

U.S. Utility patent application Ser. No. 15/217,816 also claims priority pursuant to 35 U.S.C. § 120 as a continuation-in-part of U.S. Utility application Ser. No. 14/150,392, entitled "METHOD AND APPARATUS FOR DETECTING RF FIELD STRENGTH", filed Jan. 8, 2014, now U.S. Pat. No. 9,825,608, issued on Nov. 21, 2017, which is a divisional of U.S. Utility application Ser. No. 13/209,420, entitled "METHOD AND APPARATUS FOR DETECTING RF FIELD STRENGTH", filed Aug. 14, 2011, now U.S. Pat. No. 8,749,319, issued on Jun. 10, 2014, which claims priority pursuant to 35 U.S.C. § 119(e) to U.S. Provisional Application No. 61/428,170, entitled "METHOD AND APPARATUS FOR VARYING AN IMPEDANCE", filed Dec. 29, 2010 and U.S. Provisional Application No. 61/485,732, entitled "METHOD AND APPARATUS FOR SENSING ENVIRONMENTAL CONDITIONS USING AN RFID TAG", filed May 13, 2011, all of which are hereby incorporated herein by reference in their entirety and made part of the present U.S. Utility Patent Application for all purposes.

U.S. Utility application Ser. No. 13/209,420 also claims priority pursuant to 35 U.S.C. § 120 as a continuation-in-part of U.S. Utility application Ser. No. 12/462,331, entitled "METHOD AND APPARATUS FOR VARYING AN IMPEDANCE", filed Aug. 1, 2009, now U.S. Pat. No. 8,081,043, issued on Dec. 20, 2011, which is a divisional of U.S. Utility application Ser. No. 11/601,085, entitled "METHOD AND APPARATUS FOR VARYING AN IMPEDANCE", filed Nov. 18, 2006, now U.S. Pat. No. 7,586,385, issued on Sep. 8, 2009, all of which are hereby incorporated herein by reference in their entirety and made part of the present U.S. Utility Patent Application for all purposes.

U.S. Utility patent application Ser. No. 15/217,816 also claims priority pursuant to 35 U.S.C. § 120 as a continuation-in-part of U.S. Utility application Ser. No. 14/256,877, entitled "METHOD AND APPARATUS FOR SENSING ENVIRONMENT USING A WIRELESS PASSIVE SENSOR", filed Apr. 18, 2014, now U.S. Pat. No. 9,785,807, issued on Oct. 10, 2017, which claims priority pursuant to 35 U.S.C. § 119(e) to U.S. Provisional Application No. 61/814,241, entitled "RFID ENVIRONMENTAL SENSOR", filed Apr. 20, 2013; U.S. Provisional Application No. 61/833,150, entitled "RESONANT ANTENNA", filed Jun. 10, 2013; U.S. Provisional Application No. 61/833,167, entitled "RFID TAG", filed Jun. 10, 2013; U.S. Provisional Application No. 61/833,265, entitled "RFID TAG", filed Jun. 10, 2013; U.S. Provisional Application No. 61/871,167, entitled "RESONANT ANTENNA", filed Aug. 28, 2013; U.S. Provisional Application No. 61/875,599, entitled "CMF ACCURATE SENSOR", filed Sep. 9, 2013; U.S. Provisional Application No. 61/896,102, entitled "RESONANT ANTENNA", filed Oct. 27, 2013; U.S. Provisional Application No. 61/929,017, entitled "RFID ENVIRONMENTAL SENSOR", filed Jan. 18, 2014; U.S. Provisional Application No. 61/934,935, entitled "RFID ENVIRONMENTAL SENSOR", filed Feb. 3, 2014; all of which are hereby incorporated herein by reference in their entirety and made part of the present U.S. Utility Patent Application for all purposes.

U.S. Utility application Ser. No. 14/256,877 also claims priority pursuant to 35 U.S.C. § 120 as a continuation-in-part of U.S. Utility application Ser. No. 13/209,420, entitled "METHOD AND APPARATUS FOR DETECTING RF FIELD STRENGTH", filed Aug. 14, 2011, now U.S. Pat. No. 8,749,319, issued on Jun. 10, 2014, which claims priority pursuant to 35 U.S.C. § 119(e) to U.S. Provisional Application No. 61/428,170, entitled "METHOD AND APPARATUS FOR VARYING AN IMPEDANCE", filed Dec. 29, 2010 and U.S. Provisional Application No. 61/485,732, entitled "METHOD AND APPARATUS FOR SENSING ENVIRONMENTAL CONDITIONS USING AN RFID TAG", filed May 13, 2011, all of which are hereby incorporated herein by reference in their entirety and made part of the present U.S. Utility Patent Application for all purposes.

U.S. Utility application Ser. No. 13/209,420 also claims priority pursuant to 35 U.S.C. § 120 as a continuation-in-part of U.S. Utility application Ser. No. 12/462,331, entitled "METHOD AND APPARATUS FOR VARYING AN IMPEDANCE", filed Aug. 1, 2009, now U.S. Pat. No. 8,081,043, issued on Dec. 20, 2011, which is a divisional of U.S. Utility application Ser. No. 11/601,085, entitled "METHOD AND APPARATUS FOR VARYING AN IMPEDANCE", filed Nov. 18, 2006, now U.S. Pat. No. 7,586,385, issued on Sep. 8, 2009, all of which are hereby incorporated herein by reference in their entirety and made part of the present U.S. Utility Patent Application for all purposes.

U.S. Utility application Ser. No. 14/256,877 also claims priority pursuant to 35 U.S.C. § 120 as a continuation-in-part of U.S. Utility application Ser. No. 13/209,425, entitled "METHOD AND APPARATUS FOR DETECTING RF FIELD STRENGTH", filed Aug. 14, 2011, now U.S. Pat. No. 9,048,819, issued on Jun. 2, 2015, which claims priority pursuant to 35 U.S.C. § 119(e) to U.S. Provisional Application No. 61/428,170, entitled "METHOD AND APPARATUS FOR VARYING AN IMPEDANCE", filed Dec. 29, 2010 and U.S. Provisional Application No. 61/485,732, entitled "METHOD AND APPARATUS FOR SENSING ENVIRONMENTAL CONDITIONS USING AN RFID TAG", filed May 13, 2011, all of which are hereby incorporated herein by reference in their entirety and made part of the present U.S. Utility Patent Application for all purposes.

U.S. Utility application Ser. No. 13/209,425 also claims priority pursuant to 35 U.S.C. § 120 as a continuation-in-part of U.S. Utility application Ser. No. 12/462,331, entitled "METHOD AND APPARATUS FOR VARYING AN IMPEDANCE", filed Aug. 1, 2009, now U.S. Pat. No. 8,081,043, issued on Dec. 20, 2011, which is a divisional of U.S. Utility application Ser. No. 11/601,085, entitled "METHOD AND APPARATUS FOR VARYING AN IMPEDANCE", filed Nov. 18, 2006, now U.S. Pat. No. 7,586,385, issued on Sep. 8, 2009, all of which are hereby incorporated herein by reference in their entirety and made part of the present U.S. Utility Patent Application for all purposes.

U.S. Utility application Ser. No. 14/256,877 also claims priority pursuant to 35 U.S.C. § 120 as a continuation-in-part of U.S. Utility application Ser. No. 13/467,925, entitled "ROLL-TO-ROLL PRODUCTION OF RFID TAGS", filed May 9, 2012, now U.S. Pat. No. 10,224,902, issued on Mar. 5, 2019, which is a continuation-in-part of U.S. Utility application Ser. No. 13/209,425, entitled "METHOD AND APPARATUS FOR DETECTING RF FIELD STRENGTH", filed Aug. 14, 2011, now U.S. Pat. No. 9,048,819, issued on Jun. 2, 2015, which claims priority pursuant to 35 U.S.C. § 119(e) to U.S. Provisional Application No. 61/428,170, entitled "METHOD AND APPARATUS FOR VARYING AN IMPEDANCE", filed Dec. 29, 2010 and U.S. Provisional Application No. 61/485,732, entitled "METHOD AND APPARATUS FOR SENSING ENVIRONMENTAL CONDITIONS USING AN RFID TAG", filed May 13, 2011, all of which are hereby incorporated herein by reference in their entirety and made part of the present U.S. Utility Patent Application for all purposes.

U.S. Utility application Ser. No. 13/209,425 also claims priority pursuant to 35 U.S.C. § 120 as a continuation-in-part of U.S. Utility application Ser. No. 12/462,331, entitled "METHOD AND APPARATUS FOR VARYING AN IMPEDANCE", filed Aug. 1, 2009, now U.S. Pat. No. 8,081,043, issued on Dec. 20, 2011, which is a divisional of U.S. Utility application Ser. No. 11/601,085, entitled "METHOD AND APPARATUS FOR VARYING AN IMPEDANCE", filed Nov. 18, 2006, now U.S. Pat. No. 7,586,385, issued on Sep. 8, 2009, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to wireless communications and more particularly to wireless sensors and applications thereof.

Description of Related Art

Wireless communication systems are known to include wireless transceivers that communication directly and/or over a wireless communication infrastructure. In direct wireless communications, a first wireless transceiver includes baseband processing circuitry and a transmitter to convert data into a wireless signal (e.g., radio frequency (RF), infrared (IR), ultrasound, near field communication (NFC), etc.). Via the transmitter, the first wireless transceiver transmits the wireless signal. When a second wireless transceiver is in range (e.g., is close enough to the first wireless transceiver to receive the wireless signal at a sufficient power level), it receives the wireless signal via a receiver and converts the signal into meaningful information (e.g., voice, data, video, audio, text, etc.) via baseband processing circuitry. The second wireless transceiver may wirelessly communicate back to the first wireless transceiver in a similar manner.

Examples of direct wireless communication (or point-to-point communication) include walkie-talkies, Bluetooth, ZigBee, Radio Frequency Identification (RFID), etc. As a more specific example, when the direct wireless communication is in accordance with RFID, the first wireless transceiver may be an RFID reader and the second wireless transceiver may be an RFID tag.

For wireless communication via a wireless communication infrastructure, a first wireless communication device transmits a wireless signal to a base station or access point, which conveys the signal to a wide area network (WAN) and/or to a local area network (LAN). The signal traverses the WAN and/or LAN to a second base station or access point that is connected to a second wireless communication device. The second base station or access point sends the signal to the second wireless communication device. Examples of wireless communication via an infrastructure include cellular telephone, IEEE 802.11, public safety systems, etc.

In many situations, direct wireless communication is used to gather information that is then communicated to a computer. For example, an RFID reader gathers information from RFID tags via direct wireless communication. At some later point in time (or substantially concurrently), the RFID reader downloads the gathered information to a computer via a direct wireless communication or via a wireless communication infrastructure.

For instance, in automobiles, wireless tire pressure monitoring sensors are used to provide tire pressure information to an automobile's computer. The sensors may indirectly or directly sense tire pressure. For example, indirect sensing calculates tire pressure from measured revolutions of the tire via the sensor. As another example, direct sensing measures the tire pressure from inside the tire. Direct sensing provides a more accurate measure of tire pressure than indirect sensing, but does so at a cost. In particular, direct wireless sensors include a battery and micro-electromechanical semiconductor (MEMS) circuitry to sense the tire pressure.

BRIEF DESCRIPTION OF THE SEVERAL VIEWS OF THE DRAWING(S)

FIG. 10 is a schematic block diagram of an example of a wireless sensor receiving an RF signal in accordance with the present invention; and FIG. 11 is a logic diagram of an embodiment of a method for calibrating a wireless sensor in accordance with the present invention.

DETAILED DESCRIPTION OF THE INVENTION

Figure 1:
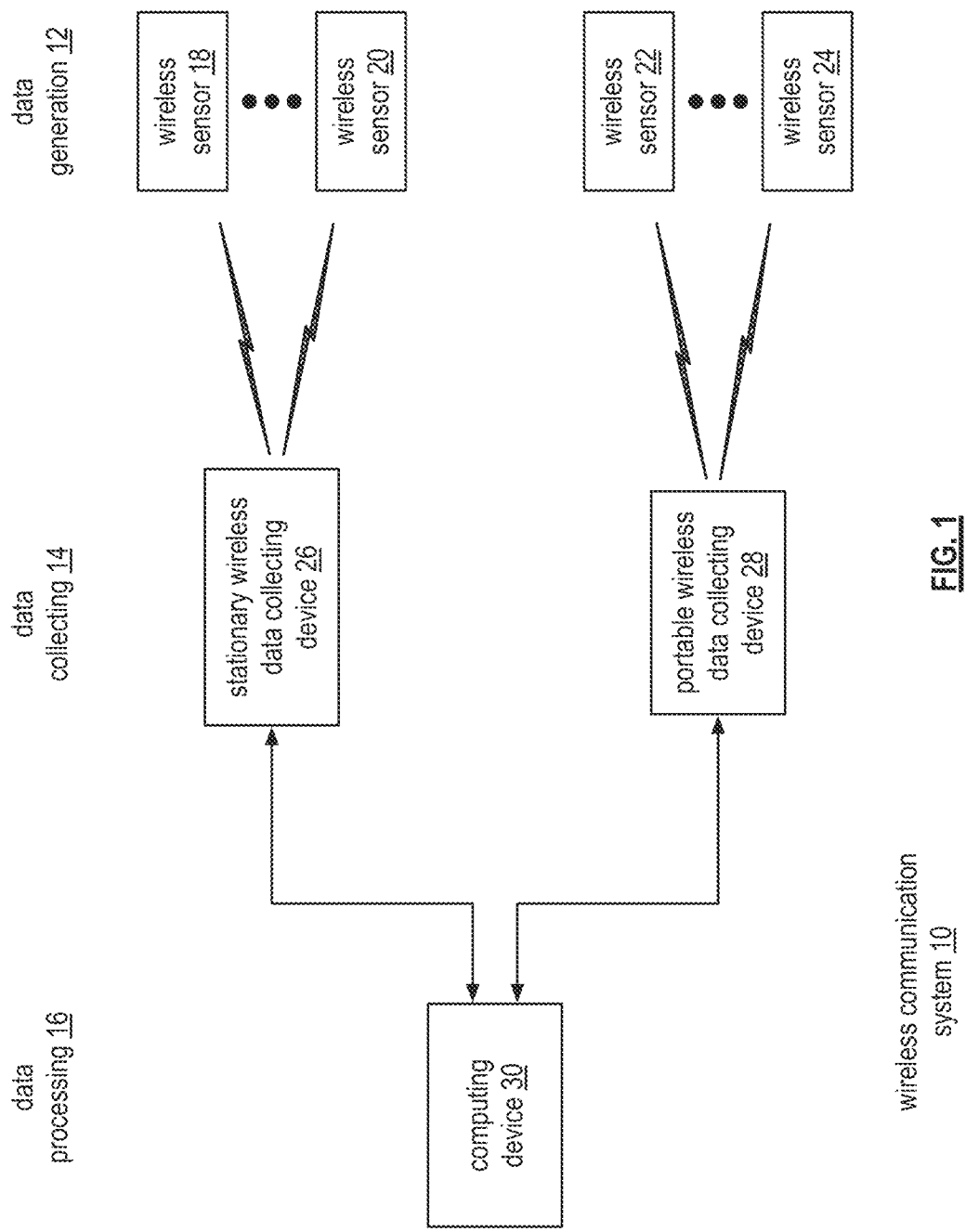
FIG. 1 is a schematic block diagram of an embodiment of a wireless communication system in accordance with the present invention.

FIG. 1 is a schematic block diagram of an embodiment of a wireless communication system 10 that includes three categories of devices: data generation 12, data collecting 14, and data processing 16. As shown, the data generation category 12 includes wireless sensors 18-24. The wireless sensors 18-24 may be implemented in a variety of ways to achieve a variety of data generation functions. For example, a wireless sensor includes a passive RFID topology and a sensing feature to sense one or more environmental conditions (e.g., moisture, temperature, pressure, humidity, altitude, sonic wave (e.g., sound), human contact, surface conditions, tracking, location, etc.) associated with an object (e.g., a box, a personal item (e.g., clothes, diapers, etc.), a pet, an automobile component, an article of manufacture, an item in transit, etc.). As another example, the wireless sensor includes an active RFID topology and a sensing feature. As yet another example, the wireless sensor includes processing circuitry and a transceiver for use with a personal area network (e.g., Bluetooth), a local area network (e.g., Wi-Fi, local wireless area network), and/or a wide area network (e.g., cellular voice and/or data).

The data collecting category 14 includes stationary wireless collecting devices 26 and/or portable wireless data collecting devices 28. The construct of a wireless data collecting device 26 and/or 28 is at least partially dependent on the data generation devices of category 12. For example, when a wireless sensor includes an RFID topology, the wireless data collecting device 26 and/or 28 is an RFID reader. As a specific example, the portable wireless data collecting device 28 is a hand-held RFID reader and the stationary wireless collecting device 26 is a RFID reader mounted in a particular location (e.g., on an assembly line of a manufacturing process).

In general, the wireless sensors 18-24 generate data that is wirelessly communicated to the wireless data collecting devices 26 and/or 28. A wide variety of wireless communication protocols and/or standards may be used. For example, the wireless communication is in accordance with one or more RFID wireless communication standards and/or protocols. As another example, the wireless communication is in accordance with Bluetooth, ZigBee, IEEE 802.11, etc.

The data processing category 16 includes one or more computing devices 30. The computing device 30 may be a personal computer, a tablet computer, a laptop, a mainframe computer, and/or a server. The computing device 30 communicates with the wireless data collecting devices via a wired and/or wireless local area network, wide area network, or point-to-point network.

As an example, the wireless communication system 10 is deployed in a factory that assembles a product from multiple components in multiple stages occurring in multiple locations within the factory. Each of the components includes a wireless sensor that identifies the component and may further generate data regarding one or more environmental conditions of the component. In some locations within the factory, stationary wireless data collecting devices are positioned to communicate with the wireless sensors in their proximal area. In other locations of the factory, employees use the portable wireless data collecting devices 28 to communication with the wireless sensors in their proximal area.

As the wireless data collecting devices 26 and 28 communicate with the wireless sensors 18-24, they collect data from the sensors and relay the data to the computing device 30. The computing device processes the data to determine a variety of information regarding the assembly of the products, defects, efficiency, etc.

While the categories 12-16 of the wireless communication system are shown to have separate devices, a device may span multiple categories. For example, a data collecting device includes functionality to process at least some of the data it collects. As another example, a wireless sensor includes functionality to store and/or interpret the data it is collecting.

Figure 2:
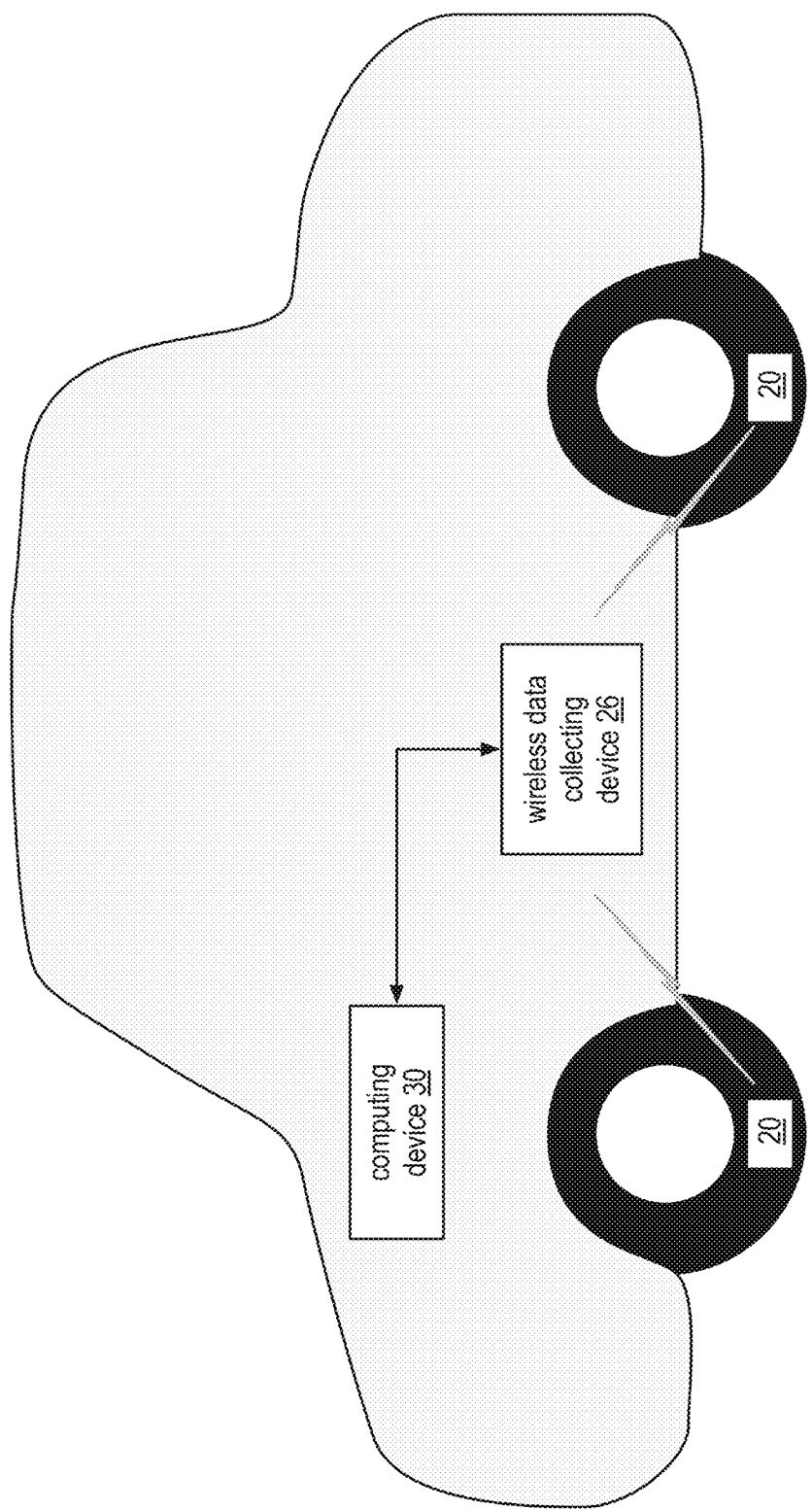
FIG. 2 is a schematic block diagram of an embodiment of a wireless communication system within a vehicle in accordance with the present invention.

FIG. 2 is a schematic block diagram of an embodiment of a wireless communication system within a vehicle. The wireless communication system includes a plurality of wireless sensors 20, one or more wireless data collecting devices 26, and a computing device 30. In an example embodiment, the wireless sensors 20 are passive sensors having an RFID topology that are positioned within tires of the vehicle; the wireless data collecting device 26 is an RFID reader, or multiple RFID readers; and the computing device 30 is the on-board computer of the vehicle.

In an example of operation, the wireless data collecting device 26 transmits a radio frequency (RF) signal to a wireless sensor 20 in accordance with one or more RFID communication protocols. The wireless sensor 20 converts the RF signal into a DC supply voltage that is used to power the other components of the wireless sensor, including a pressure sensing circuit. The pressure sensing circuit measures pressure within its respective tire, which is communicated back to the wireless data collecting device 26.

The wireless data collecting device 26 communicates with the other wireless sensors 20 in the same way to collect tire pressure measurements of the other tires. The wireless data collecting device 26 provides the tire pressure measurements to the computing device 30, which processes the data. For instance, the computing device may indicate that a tire pressure is too low, too high, or within an acceptable range. Note that a tire may include more than one sensor such multiple pressure measurements per tire are taken and processed.

Figure 3:
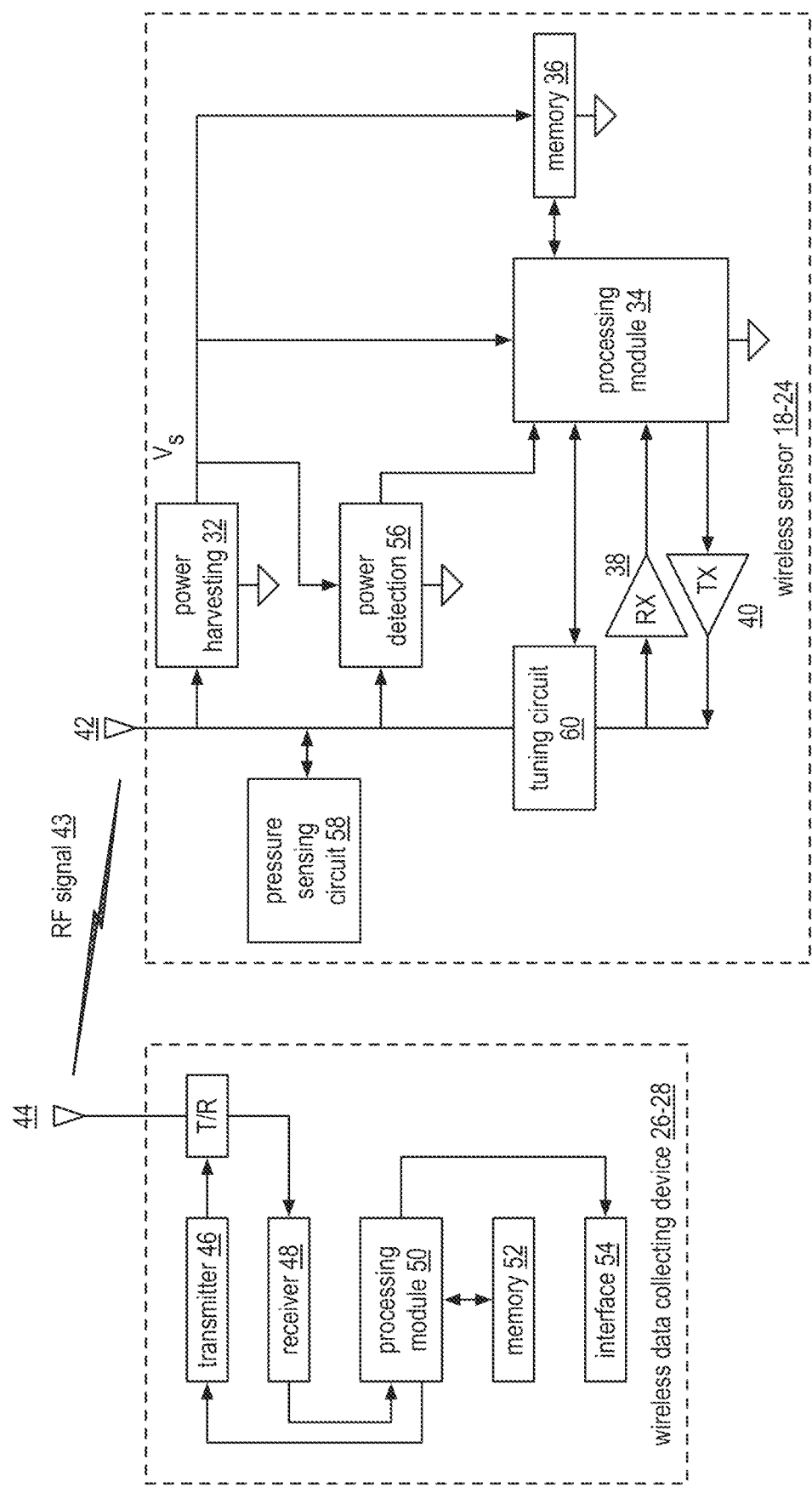
FIG. 3 is a schematic block diagram of an embodiment of a wireless data collecting device and a wireless sensor in accordance with the present invention.

FIG. 3 is a schematic block diagram of another embodiment of a wireless data collecting device 26-28 and a wireless sensor 18-24. The wireless sensor 18-24 includes a power harvesting circuit 32, a processing module 34, memory 36, a receiver section 38, a transmitter section 40, an antenna structure 42, a power detection circuit 56, a pressure sensing circuit 58, and a tuning circuit 60. The wireless data collecting device includes an antenna structure 44, a transmitter 46, a receiver 48, a transmit/receive splitter or switch (T/R), a processing module 50, memory 52, and an interface 54. The interface 54 includes firmware (e.g., software and hardware) to communicate with the computing device 30 via a wired and/or wireless LAN and/or WAN.

In an example of operation, the wireless sensor is a passive RFID tag and the wireless data collecting device is an RFID reader. The passive RFID tag is associated with an object and an object identifier is stored in the memory 36 of the wireless sensor. For the RFID reader to communicate with the passive RFID tag, the tag first generates a power supply voltage (or multiple power supply voltages) from the RF (radio frequency) signal 43 transmitted from the RFID reader. For example, the RF signal 43 is a continuous wave signal and uses amplitude shift keying (ASK) or other amplitude-based modulation scheme to convey data.

The power harvesting circuit 32 receives the RF signal 43 via the antenna 42 and converts it into one or more supply voltages (Vs). The supply voltage(s) power the other components (e.g., 34-40, 56) so that they perform their specific tasks. For instance, the receiver 38 is operable to convert an inbound message received from the RFID reader into a baseband signal that it provides to the processing module 34. The processing module 34 processes the baseband signal and, when appropriate, generates a response that is subsequently transmitted via the antenna 42 by the transmitter 40. For example, the inbound message instructs the wireless sensor to provide a respond with a pressure measurement and the stored ID of the object.

To obtain a pressure measurement, the pressure sensing circuit 58 senses the pressure within an area (e.g., within a tire of an automobile). For example, as the pressure sensing circuit 58 is subjected to different pressures (e.g., force per area measured in pounds per square inch or other units), its electrical characteristics change. For instance, a capacitance, an inductance, an impedance, a resonant frequency, or other characteristic changes (e.g., increases or decreases).

The electrical characteristics change of the pressure sensing circuit 58 causes a change in an RF characteristic of the combination of the antenna 42, the tuning circuit 60, and the pressure sensing circuit 58. Note that an RF characteristic includes an impedance (e.g., an input impedance) at a frequency (e.g., carrier frequency of the RF signal 43), a resonant frequency (e.g., of the turning circuit and/or antenna), a quality factor (e.g., of the antenna), and/or a gain. As a specific example, the resonant frequency has changed from a desired resonant frequency (e.g., matching the carrier frequency of the RF signal 43) as result of the sensed pressure.

The processing module 34 detects a variance of the one or more RF characteristics from a desired value (e.g., the resonant frequency changes from a desired frequency that corresponds to the carrier frequency of the RF signal 43). When the processing module detects the variance, it adjusts the tuning circuit to substantially re-establish the desired value of the one or more RF characteristics. For example, the tuning circuit 60 includes an inductor and a capacitor, one of which is adjusted to change the resonant frequency back to the desired value.

The processing module 34 determines the amount of adjustment of the tuning circuit 60 and converts the amount of adjustment into a digital value. The digital value is representative of the pressure sensed by the pressure sensing circuit 58. The processing module 34 generates a message regarding the adjusting of the tuning circuit (e.g., the message includes the digital value or an actual pressure measurement if the processing module performs a digital value to pressure measurement conversion function). The transmitter transmits the message to the data collecting device via the antenna 42 or another antenna (not shown in FIG. 3).

Before the processing module processes the sensed environmental condition, it may perform a power level adjustment. For example, the power detection circuit 56 detects a power level of the received RF signal 43. In one embodiment, the processing module interprets the power level and communicates with the RFID reader to adjust the power level of the RF signal 43 to a desired level (e.g., optimal for accuracy in detecting the environmental condition). In another embodiment, the processing module includes the received power level data with the environmental sensed data it sends to the RFID reader so that the reader can factor the power level into the determination of the extent of the environmental condition.

The processing module 34 may be further operable to perform a calibration function when the pressure in which the wireless sensor is known (e.g., in a room at a certain altitude, in a calibration chamber having a set pressure, etc.). For example, the processing module 34 receives a calibration request from a data collecting device. In response, the processing module adjusts the tuning circuit to establish the desired value of the RF characteristic(s) (e.g., resonant frequency, input impedance, quality factor, gain, etc.). The processing module then records a level of the adjusting of the tuning circuit to represent a pressure calibration of the wireless sensor (e.g., records a digital value). The processing module may communicate the calibration value to the data collecting device as part of the calibration process or send it along with the digital value of a pressure measurement.

Figure 4:
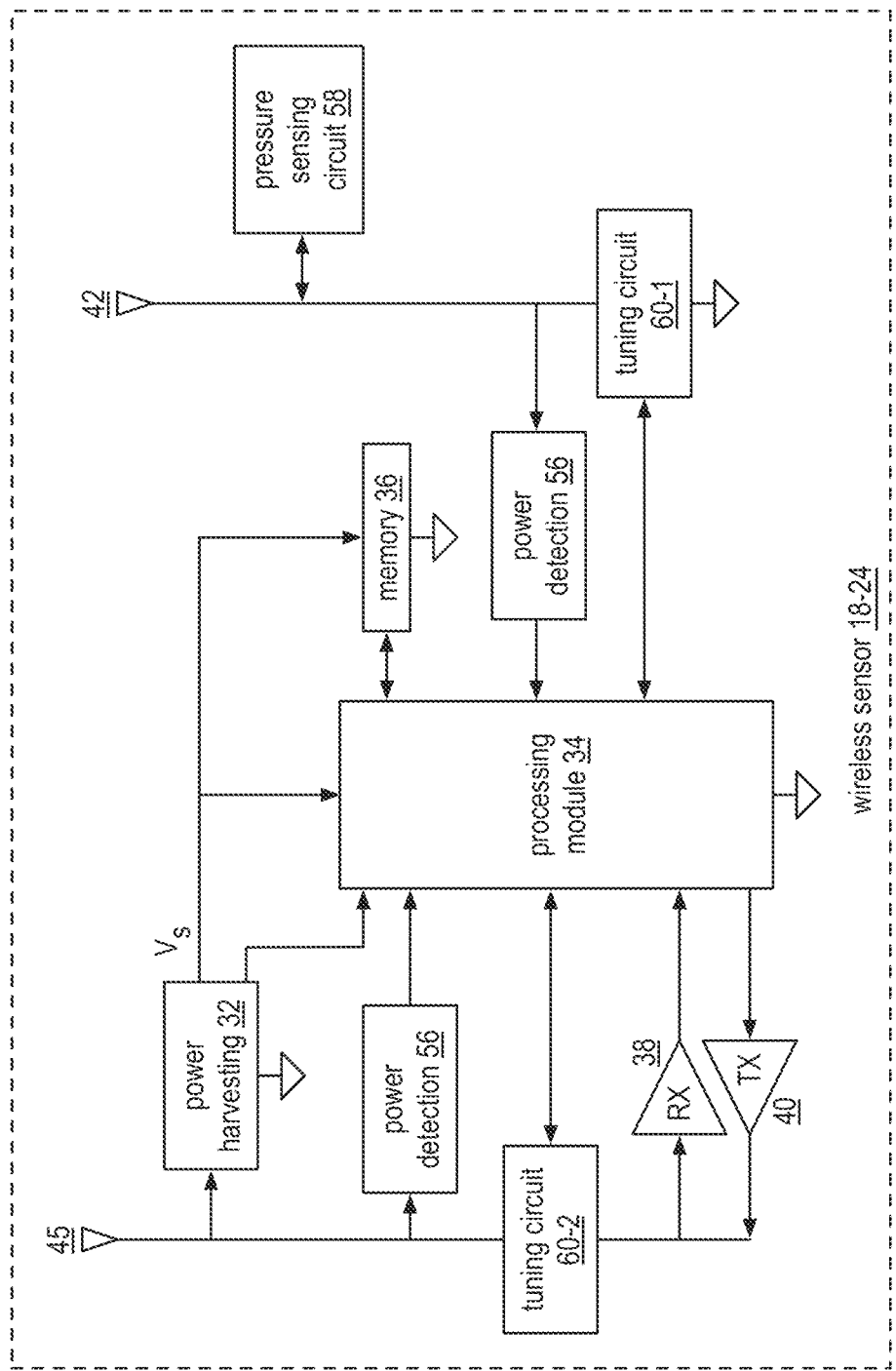
FIG. 4 is a schematic block diagram of another embodiment of a wireless sensor in accordance with the present invention.

FIG. 4 is a schematic block diagram of another embodiment of a wireless sensor 18-24 that includes the power harvesting circuit 32, the processing module 34, memory 36, the receiver section 38, the transmitter section 40, a first antenna structure 42, a second antenna structure 45, one or more power detection circuits 56, a pressure sensing circuit 58, a first tuning circuit 60-1, and a second tuning circuit 60-2. Each of the first and second antenna structures 42 and 45 include an antenna (e.g., monopole, dipole, helical, etc.) and may further include impedance matching circuitry, filtering circuitry, and/or one or more additional antennas for beamforming, diversity, and/or other antenna array configurations and/or applications.

In this embodiment, the pressure sensing is separated from the power harvesting and communication. For instance, the pressure sensing circuit 58 is operably coupled to the first antenna structure 42, where operably coupled means, in addition to as otherwise defined herein, in close physical proximity to affect RF characteristics of the antenna 42 and/or tuning circuit 60-1 and/or electrically connected to the antenna and/or tuning circuit. The pressure sensing circuit 58, the processing module 34, and the tuning circuit 60-1 function as described herein to generate a digital representation of a pressure measurement.

The pressure sensing side of the wireless sensor may further include a separate power detection circuit 56 to provide power measurements to the processing module regarding the RF signal received via antenna 42. The processing module 34 may use the power information to interpret the RF characteristic changes or may provide a digital representation of received power of the antenna 42 to the data collection device. For example, the processing module 34 calibrates pressure sensing based on a particular input power and a known pressure level. When a pressure measurement is taken and the input power deviates from the particular input power of calibration, the processing module 34 either factors that into the pressure sensing measurement, requests a transmit power adjustment by the data collecting device, and/or provides a digital representation of the received input power and a digital representation of the pressure measurement to the data collecting device.

The second antenna structure 45 supports the separate power harvesting and communication. On this side of the wireless sensor, the power harvesting circuit 32, the power detection circuit 56 (which is optional for this side of the wireless sensor), the second tuning circuit 60-2, the receiver 38, the transmitter 40, and the processing module 34 function to optimize the generation of power and communication with the data collecting device. For instance, the processing module 34 adjusts the tuning circuit 60-2 to align its resonant frequency with the frequency of the RF signal 43 allowing for more efficient power harvesting.

With the separation of sensing from power harvesting and communication, the first antenna structure 42 may be located in an area that has less reception of the RF signal than the second antenna structure 45. For example, the first antenna structure 42 and the pressure sensing circuit are positioned on a printed circuit board that is mounted within a tire where the steel rim and the steel cabling of the tire limit reception of the RF signal 43 by the antenna 42. The second antenna 45 is located outside of the tire (e.g., along the stem of the tire or elsewhere) and thus the rim and the tire do not limit its reception of the RF signal.

Figure 5:
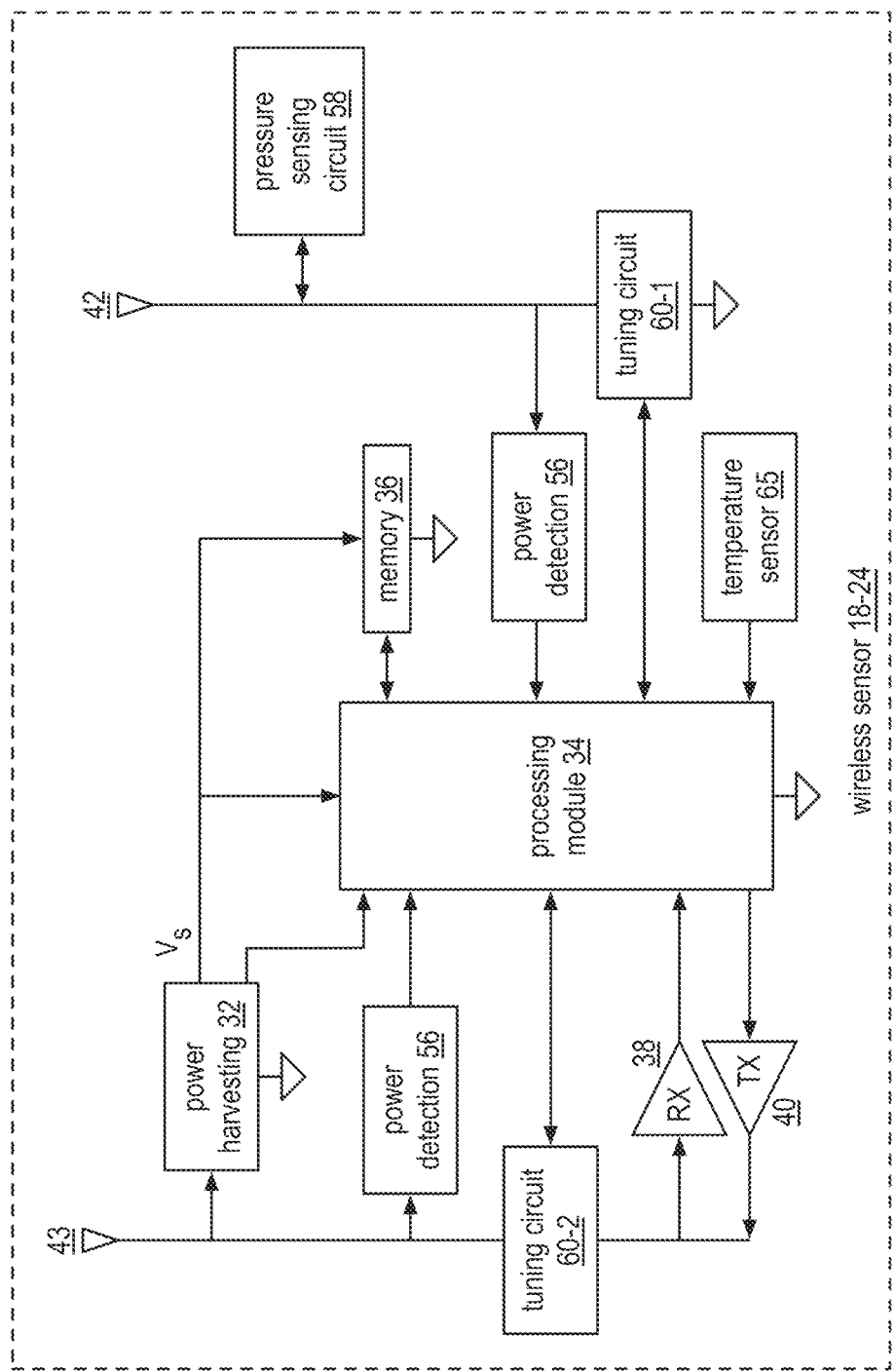
FIG. 5 is a schematic block diagram of another embodiment of a wireless sensor in accordance with the present invention.

FIG. 5 is a schematic block diagram of another embodiment of a wireless sensor 18-24 that is similar to the wireless sensor of FIG. 4 with the addition of a temperature sensor 65. When the wireless sensor is powered up (e.g., the power harvesting circuit 32 is producing a power supply voltage), the temperature sensor 65 is enabled to measure temperature of its environment. The temperature sensor 65 may have a variety of implementations. For example, the temperature sensor 65 has a thermocouple topology to produce a voltage representative of temperature. As another example, the temperature sensor 65 includes a temperature sensing diode. As another example, the temperature sensor 65 includes circuitry that, as temperature varies, causes an RF characteristic of the antenna and/or tuning circuit to vary.

Figure 6:
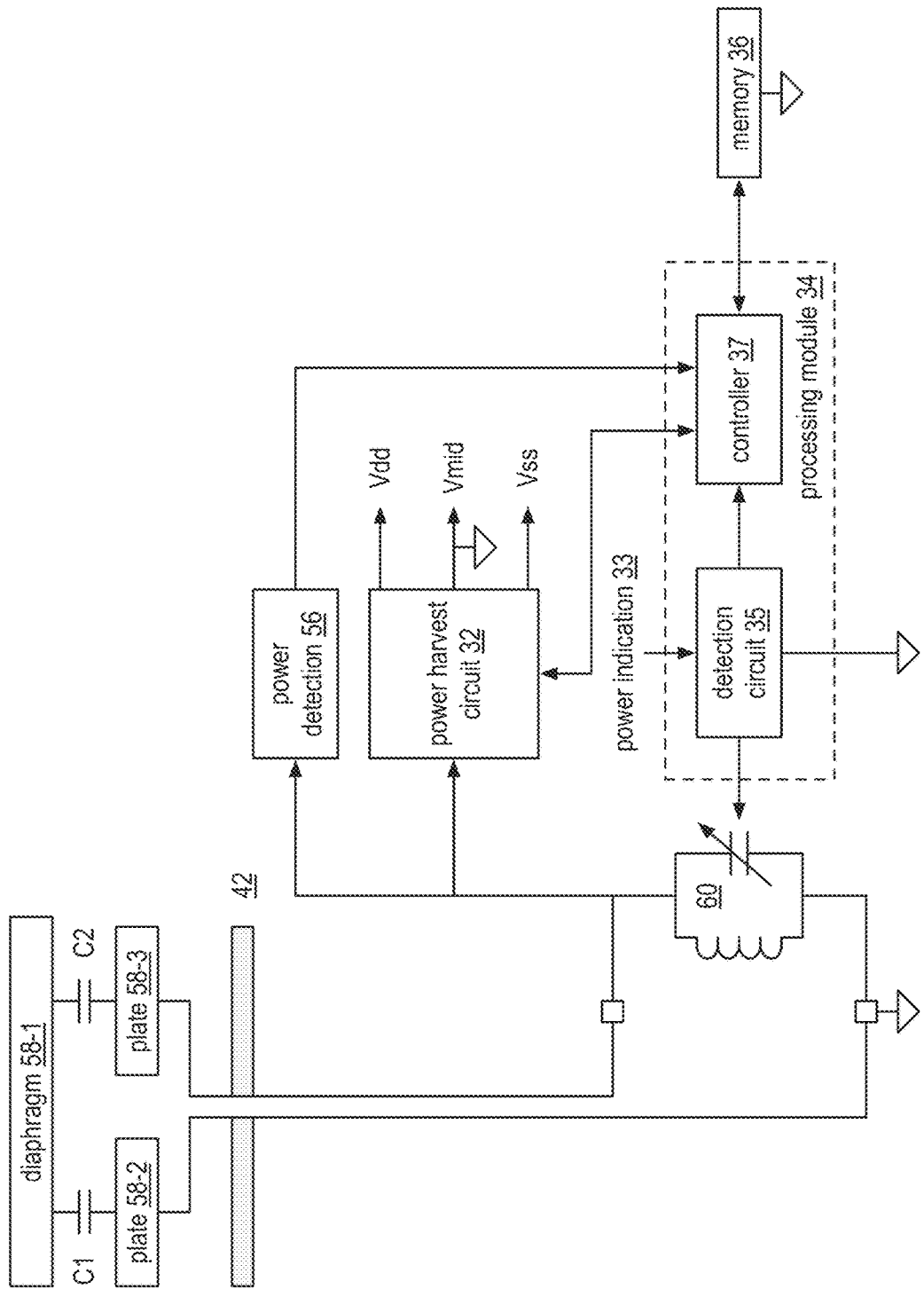
FIG. 6 is a schematic block diagram of an embodiment of a pressure sensing circuit of a wireless sensor in accordance with the present invention.

FIG. 6 is a schematic block diagram of an embodiment of a pressure sensing circuit 58 that includes a metallic diaphragm 58-1 and capacitive plates 58-2 and 58-3, which form a variable capacitance circuit. Capacitive plate 58-2 with the diaphragm 58-1 form a first capacitance C1 and capacitive plate 58-3 with the diaphragm 58-1 form a second capacitance C2. The total capacitance of the pressure sensing circuit 58 is the series combination of C1 and C2. The first capacitive plate 58-2 is coupled to a first antenna element of antenna 42 (which is shown as a dipole antenna) and the second capacitive plate 58-3 is coupled to a second antenna element of the antenna 42.

The first capacitive plate 58-2, the second capacitive plate 58-3, and the diaphragm 58-1 are sized and spaced to provide specific capacitance values for C1 and C2. The specific capacitance values are based on the carrier frequency of the RF signal and a desired amount of change of the one or more RF characteristics of the front-end of the sensor 18-24. For example, at a carrier frequency of 900 MHz, the input impedance of the front-end is 50 Ohms, and a desired change is about 25%, then the impedance of the series combination at 900 MHz is about 12.5 Ohms (e.g., 25% of 50 Ohms) and the series capacitance is about 14 pF.

When the diaphragm 58-1 is compressed, the total capacitance increases, which causes a change in the one or more RF characteristics of the front-end (e.g., impedance). When the antenna 42 receives an RF signal (with the diaphragm compressed), the power detection circuit 56 and power harvesting circuit function as previously described. The processing module 34, which includes a detection circuit 35 and a controller 37, receives a power indication 33 (e.g., the input power, the supply voltage, a supply current, input voltage, etc.) that corresponds to the input power of the RF signal. The detection circuit 35 adjusts the varactor of the tuning circuit 60, which further includes an inductor, to change the one or more RF characteristics. When the power indication 33 indicates a maximum, or near maximum, power level (voltage, and/or current without saturation), of the front-end of the sensor (e.g., the antenna 4, the tuning circuit 60, and/or the pressure sensing circuit 58) is in resonance, or near resonance, with the carrier frequency of the RF signal. The controller 37 determines the amount that the tuning circuit was adjusted and created a digital representation thereof. The digital representation may be stored in memory 36 and/or transmitted to a data collecting device 26-28.

Figure 7:
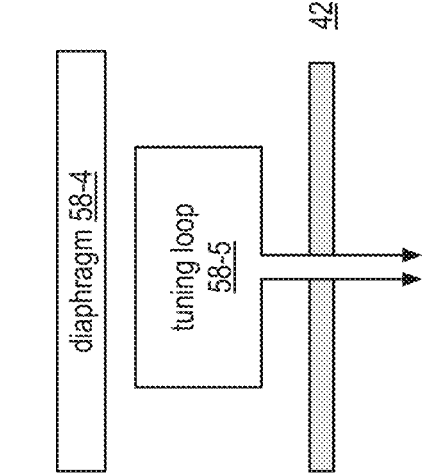
FIG. 7 is a schematic block diagram of another embodiment of a pressure sensing circuit of a wireless sensor in accordance with the present invention.

FIG. 7 is a schematic block diagram of another embodiment of a pressure sensing circuit 58 that includes a tuning loop 58-5 and a diaphragm 58-4. The tuning loop 58-5 is coupled to the antenna elements of the antenna 42. The diaphragm 58-4 is a metal plate that, as it is compressed towards the tuning loop 58-5, decreases the inductance of the tuning loop 58-5. A change in the inductance of the tuning loop 58-5 causes a change in the one or more RF characteristics of the front-end. As such, changes in the inductance corresponds to varying pressures applied to the diagram.

Figure 8:
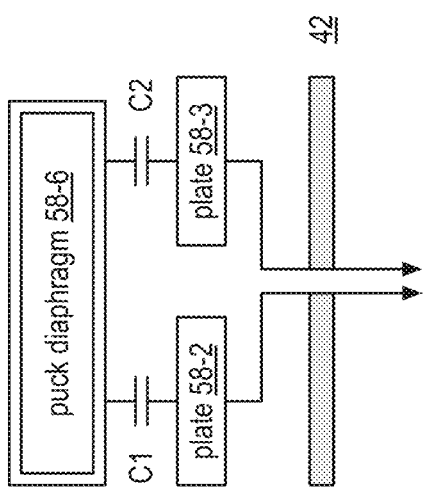
FIG. 8 is a schematic block diagram of another embodiment of a pressure sensing circuit of a wireless sensor in accordance with the present invention.

FIG. 8 is a schematic block diagram of another embodiment of a pressure sensing circuit 58 that is similar to the pressure sensing circuit of FIG. 6 with a puck diaphragm 58-6 replacing the diaphragm 58-1. The puck diaphragm 58-6 is comprised of a metal material that includes a hermetically sealed core. The core may be a vacuum core, a gas filled core (e.g., a gas with low expansion-contraction over temperature), a dry nitrogen filed core, a gasless core, etc. As pressure is applied to the puck diaphragm 58-6, the total capacitance of the pressure sensing circuit is reduced, which causes a change in the one or more RF characteristics of the front-end. In an embodiment, the bottom surface of the puck (e.g., the surface towards the plates 58-2 and 58-3) is thinner than the side walls and top surface (as orientated in the figure) such that it is the surface that primarily moves in response to pressure.

Figure 9:
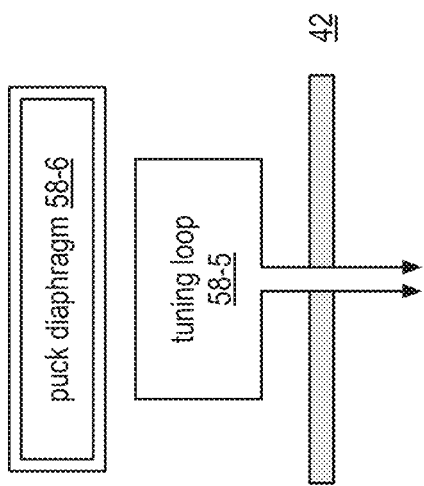
FIG. 9 is a schematic block diagram of another embodiment of a pressure sensing circuit of a wireless sensor in accordance with the present invention.

FIG. 9 is a schematic block diagram of another embodiment of a pressure sensing circuit 58 that is similar to the pressure sensing circuit of FIG. 7 with a puck diaphragm 58-6 replacing the diaphragm 58-4. The puck diaphragm 58-6 is comprised of a metal material and includes a vacuum core. As pressure is applied to the puck diaphragm 58-6, the inductance of the tuning loop 58-5 is increased, which causes a change in the one or more RF characteristics of the front-end.

FIG. 10 is a schematic block diagram of an example of a wireless sensor 18-24 receiving an RF signal 43. A data collecting device transmits the RF signal 43 at a given power level, which may be received by the wireless sense at a received power level ranging from a minimum input power to a maximum input power. In an embodiment, the RF signal 43 is a continuous wave at a given frequency (fc).

In many instances, it is desirable to have the input power level at a particular level (e.g., the minimum level or other level). For example, the RF characteristic of the antenna and tuning circuit are dependent on the input power level. As such, the input power level needs to be accounted for to accurately tune the tuning circuit. In one embodiment, the input power is accounted for by the wireless sensor communicating with the data collection device to lower the transmit power of the RF signal such that the wireless sensor receives it at the desire input power level. In another embodiment, the wireless sensor determines the input power level and provides an indication of the input power level along with the tuning circuit adjustment to the data collecting device.

FIG. 11 is a logic diagram of an embodiment of a method for calibrating a wireless sensor in a known environment with known environmental conditions (e.g., moisture, temperature, pressure, etc.). The method begins at step 100 where the power harvesting circuit converts the continuous wave signal (e.g., the RF signal 43) into a power supply voltage(s). The method continues at step 102 where a determination is made as to whether there is sufficient power to power the wireless sensor. For example, a determination is made as to whether the power supply voltage has reached a desired voltage level. If not, the method repeats at step 100.

When there is sufficient power, the method continues at step 104 where the processing module adjusts the tuning circuit to change a resonant frequency (fr) of the input section of the wireless sensor (e.g., the antenna, the tuning circuit, the pressure sensing circuit, the temperature sensing circuit, and/or other components). Note that, at the start of calibration, the resonant frequency (fr) of the input section of the wireless sensor may be at any frequency within a range of frequencies centered about the carrier frequency of the RF signal (fc).

The method continues at step 106 where a determination is made as to whether the resonant frequency (fr) is substantially aligned with the carrier frequency (fc). For example, alignment may be determined based on an interpretation of power levels, voltage levels, and/or current levels within the wireless sensor. If not, the method repeats at step 104 by further adjusting the tuning circuit (e.g., in the same direction or in an opposition direction). If the frequencies are aligned, the method continues at step 108 where the wireless sensor is calibrated and the settings for the tuning circuit are stored as the calibration settings. The calibration settings may be stored by the wireless sensor, the data collecting device, and/or computing device.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc., any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A circuit of use in a wireless sensor comprises:
a tuning circuit;
a pressure sensing circuit operably coupled to the tuning circuit, wherein the tuning circuit and the pressure sensing circuit collectively have one or more radio frequency (RF) characteristics and wherein the pressure sensing circuit causes the one or more RF characteristics to vary with varying sensed pressures;
a processing module operable to:
   detect a variance of the one or more RF characteristics from a desired value of the one or more RF characteristics;
in response to the detecting of the variance, adjust the tuning circuit to substantially re-establish the desired value of the one or more RF characteristics; and
generate a message regarding the adjusting of the tuning circuit, wherein a level of the adjusting of the tuning circuit is representative of a variance of pressure sensed by the pressure sensing circuit; and
a transmitter operably coupled to transmit the message.

2. The circuit of claim 1, wherein the pressure sensing circuit comprises:
a variable capacitance circuit that includes a first plate, a second plate, and a diaphragm, wherein, as a result of pressure variations on the diaphragm, causes a change in capacitance of the variable capacitance circuit.

3. The circuit sensor of claim 1, wherein the pressure sensing circuit comprises:
a variable capacitance circuit that includes a first plate, a second plate, and a diaphragm puck, wherein, as a result of pressure variations on the diaphragm puck, causes a change in capacitance of the variable capacitance circuit.

4. The circuit of claim 1, wherein the pressure sensing circuit comprises:
a variable inductance circuit that includes a tuning loop and a diaphragm that, as a result of pressure variations, causes an inductance change of the tuning loop.

5. The circuit of claim 1, wherein the pressure sensing circuit comprises:
a variable inductance circuit that includes a tuning loop and a diaphragm puck that, as a result of pressure variations, causes an inductance change of the tuning loop.

6. The circuit of claim 1, wherein an RF characteristic of the one or more RF characteristics comprises:
an impedance at a frequency;
a resonant frequency;
a quality factor; or
a gain.

7. The circuit of claim 1, wherein the processing module is further operable to:
in response to a calibration request at a known pressure, adjust the tuning circuit to establish the desired value of the one or more RF characteristics; and
record a level of the adjusting of the tuning circuit to represent a pressure calibration of the wireless sensor.

8. The circuit of claim 1 further comprises:
a power harvesting operably coupled to convert a received radio frequency (RF) signal into a power supply voltage.

9. The circuit of claim 1 further comprises:
a temperature sensor operably coupled to the processing module, wherein the temperature sensor senses a temperature of an environment proximal to the wireless sensor, and wherein the processing module includes a sensed temperature within the message.

* * * * *